United States Patent [19]

Gay

[11] 3,919,305

[45] Nov. 11, 1975

[54] PROCESS FOR THE PREPARATION OF PHENYLACETIC ACID

[75] Inventor: Michel Gay, Lyon, France

[73] Assignee: Rhone-Poulenc S.A., Paris, France

[22] Filed: Sept. 5, 1973

[21] Appl. No.: 394,541

Related U.S. Application Data

[63] Continuation-in-part of Ser. No. 164,424, July 20, 1971, abandoned.

[30] Foreign Application Priority Data

July 21, 1970  France ........................ 70.26829
June 2, 1971  France ........................ 71.19979

[52] U.S. Cl. ............. 260/523 A; 260/494; 260/599
[51] Int. Cl.² .................... C07C 51/26; C07C 51/33
[58] Field of Search ............................ 260/523 A

[56] References Cited
UNITED STATES PATENTS

2,964,559  12/1960  Burney et al. ................ 260/523

3,607,719  9/1971  Barone ....................... 260/523

FOREIGN PATENTS OR APPLICATIONS

2,136,481  1/1972  Germany ................... 260/523 A

*Primary Examiner*—Robert Gerstl
*Assistant Examiner*—Richard D. Kelly
*Attorney, Agent, or Firm*—Stevens, Davis, Miller & Mosher

[57] ABSTRACT

Phenylacetic acid is obtained by oxidation of phenylacetaldehyde with air or oxygen in the presence of a transition metal derivative e.g. a derivative of Co, Mn, Cr, Cu, Fe. Oxidation may be carried out in an inert hydrocarbon, halogenated hydrocarbon, carboxylic acid or ester, nitrile, tertiary alcohol or ketone or mixtures thereof e.g. tert. butanol and acetic adid. The catalyst may contain additionally derivatives of Group 3a or 4a metals.

10 Claims, No Drawings

PROCESS FOR THE PREPARATION OF PHENYLACETIC ACID

This is a continuation-in-part of my application Ser. No. 164424 filed July 20th 1971, now abandoned.

The present invention relates to a process for the preparation of phenylacetic acid by oxidation of phenylacetaldehyde with molecular oxygen or a gas containing molecular oxygen.

Phenylacetic acid is an important industrial product used either as such or in the form of its salts, amides or esters (potassium phenylacetate, methyl phenylacetate or phenylacetamide) as a precursor in the manufacture of penicillin. Phenylacetic acid is also used for the preparation of phenylacetone, and certain of its esters are employed in perfumery.

The only industrial process for the preparation of phenylacetic acid involves alkaline or acid hydrolysis of phenylacetonitrile, itself obtained by reaction of hydrocyanic acid or of alkali cyanides with benzyl chloride. Despite the good yields obtained, this process is relatively complicated and it is desirable to have available a simpler process for the preparation of phenylacetic acid.

The present invention provides a process for the preparation of phenylacetic acid wherein phenylacetaldehyde is oxidised with molecular oxygen or with a gas containing moleculer oxygen, in the presence of a derivative of at least one transition metal.

The process of the invention makes it possible to obtain phenylacetic acid in excellent yields from a starting material easily obtained by oxidation of styrene with thallic ions (see U.S. Pat. Nos. 3,048,636 and 3,452,047). The term transition metals is used in this specification to describe the metals of Groups 1b, 2b, 3b, 4b, 5b, 6b, 7b, and 8 of the Periodic Classification of the Elements (Handbook of Chemistry and Physics, 45th Edition page B-2).

Preferred catalysts to be used in the process of the invention are those consisting essentially of at least one metal derivative where the metal is at least one selected from the group consisting of chromium, manganese, cobalt, iron and copper or at least two metal derivatives where at least one metal is selected from the group consisting of chromium, manganese, cobalt, iron and copper and at least one metal is selected from the group consisting of tungsten, titanium, molybdenum, thallium, palladium, nickel, cerium, uranium, lead and silver.

Derivatives of chromium, manganese, cobalt, iron and copper can be used to catalyse the reaction. The oxidation level of the metal in the metal derivative is not critical and the derivative can be formed "in situ" from the free metal, under the reaction conditions. In general, however, it is preferred to employ preformed metal derivatives which can be in the form of salts of inorganic or organic acids, of chelates or of complexes derived from monodentate or polydentate ligands. The radical associated with the metal in the catalyst is not critical for the oxidation reaction; however, for practical reasons, the metal compounds which are soluble in the reaction medium are preferentially chosen.

Metal salts which can be used, include the halides, sulphates, phosphates or nitrates; salts of organic acids, such as those of aliphatic carboxylic acids containing from 1 to 30 carbon atoms such as formic, acetic, propionic, butyric, hexanoic, octanoic, stearic, oleic, palmitic and naphthenic acids; arylaliphatic acids such as phenylacetic acid; cycloaliphatic (cyclohexanecarboxylic) acids; aromatic acids such as benzoic and salicylic acids; and sulphonic acids such as methanesulphonic, ethanedisulphonic and benzenesulphonic acids. It is also possible to use chelates of the transition metals with $\beta$-dicarbonyl compounds such as the $\beta$-diketones, the $\beta$-ketoesters and the $\beta$-ketoaldehydes. Suitable $\beta$-dicarbonyl compounds include, diketones such as acetylacetone, 2,4-hexanedione, 2,4-heptanedione, 3-methoxy-2,4-pentanedione, 1,1,1-trifluoro-2,4-pentanedione, benzoylacetone and dibenzoylmethane; $\beta$-ketoesters such as methyl, ethyl or propyl acetylacetates and methyl benzoylacetate and $\beta$-ketoaldehydes such as propionylacetaldehyde, benzoylacetaldehyde and $\alpha$-formylcyclohexanone.

Specific catalysts which can be used in the process of this invention, include cobalt bromide, manganese bromide, copper bromide, cobalt chloride, manganese chloride, cuprous and cupric chlorides, chromium, cobalt and manganese sulphates, cobalt, manganese and copper phosphates, cobaltous acetate, cobaltic acetate, ferrous acetate, manganese acetate, copper acetate, cobalt octanoate, manganese octanoate, copper octanoate, copper, cobalt and manganese naphthenates, cobalt, copper and manganese stearates, cobaltous acetylacetonate, cobaltic acetylacetonate, chromium-III acetylacetonate, manganese-III acetylacetonate, ferric acetylacetonate and cupric acetylacetonate.

The reaction can be carried out in the presence of a derivative of one metal or of a combination of two or more metals. Combinations of cobalt derivatives with derivatives of other transition metals, such as V, Hg, Ru, W, Ti, Mo, Pd, Ni, Mn, Fe and Ag are very particularly suitable. The transition metal derivatives can also be combined with derivatives of metals of Groups 3a and 4a and of metals of the lanthanides and actinides groups of the Periodic Classification of the elements, (Handbook of Chemistry and Physics, 45th Edition page B2) and especially with derivatives of thallium, lead, cerium and uranium.

In this last mentioned case, the radical combined with the metal can be the same or different from that combined with the transition metal.

The amount of catalyst, expressed as a percentage by weight of metal in the reaction medium, can vary within wide limits. In general, a metal content of between 0.0001 and 5% is very suitable. An amount above 5% would not provide any additional advantage for the additional cost and most frequently, a metal content below 2% is used.

If a combination of metal derivatives is used, the amount of each of the metals introduced into the reaction medium may be within the limits defined above.

The reaction can be carried out in the absence or preferably in the presence of an inert solvent. Suitable solvents, include aliphatic hydrocarbons containing at least 4 carbon atoms (e.g. butane, pentane or hexane), cycloaliphatic hydrocarbons (e.g. cyclohexane) or aromatic hydrocarbons (e.g. benzene or toluene); alkyl, cycloalkyl or aryl halides such as chloroform, carbon tetrachloride, 1,2-dichloroethane, chlorobenzene or chlorotoluenes; aliphatic carboxylic acids which are liquid under the reaction conditions (preferably acetic acid, which may be anhydrous or contain a small amount of water); esters such as methyl or ethyl acetates; nitriles such as acetonitrile and propionitrile; tertiary alcohols such as t-butanol, t-amyl alcohol and triethylcarbinol; ketones such as acetone, methyl ethyl ketone, 2-pentanone, 3-pentanone, methyl isopropyl ketone and cyclohexanone.

These various solvents can be used individually or as a mixture with one another, in proportions which vary according to the reaction conditions (e.g. temperature, nature of the solvents and nature of the catalyst). Solvent mixtures which are particularly advantageous for carrying out the process are those consisting of tertiary alcohols mixed with aliphatic carboxylic acids, hydrocarbons, alkyl-halides, cycloalkyl-halides or aryl-halides or nitriles. In these solvent mixtures, the proportion by weight of tertiary alcohol can vary from 10 to 90%. Preferably, combinations of tertiary alcohols and aliphatic carboxylic acids, and more particularly of acetic acid and t-butanol, are used. Such mixed solvents make it possible to improve the yields of phenylacetic acid whilst restricting the formation of by-products such as benzoic acid, benzaldehyde and benzyl formate.

Though the oxidation process can be carried out in a temperature range extending from 0° to 120°C, it has been found that the best results are obtained at temperatures of the order of 10° to 60°C. In general, the temperature employed depends on the other reaction factors such as the nature of the metal of the catalyst, and the nature of the solvent.

The oxidising agent can be oxygen or air, optionally enriched in oxygen. The reaction can be carried out at normal pressure by simply passing the oxidising gas into the phenylacetaldehyde solution. The process can also be carried out under a partial pressure of oxygen which has been lowered to 0.1 bar or which can be as high as 50 bars.

Depending on the reaction conditions (particularly the nature of the catalyst, solvent and temperature), it can be advantageous to keep the reaction mixture, after stopping the passage of the oxidising gas, at a temperature which can be equal to, lower than or higher than that of the oxidation temperature, so as to allow the intermediate compounds of the reaction to become completely converted. The optimum duration of this finishing process depends on the conditions under which it is carried out and can be determined in each particular case by means of simple experiments.

The process according to the invention is very particularly suitable for being carried out continuously, in the usual apparatuses for bringing gases and liquids into contact.

The Examples which follow illustrate the invention and show how it can be put into practice.

EXAMPLE 1

The apparatus used consists of a vertical cylindrical glass reactor of 30 mm internal diameter and 270 mm height, the base of which consists of a sintered glass disc; the reactor is equipped with a gas inlet through the porous bottom, a double jacket for circulating a cooling or heating medium, an outlet tap arranged at the bottom, a thermometer and a reflux condenser.

Whilst a slight stream of oxygen is passed into the reactor, 98 cm³ of 100% strength acetic acid, 2 cm³ of water, 27.1 mg of cobalt acetate $Co(CH_3-COO)_2$. 4 $H_2O$ and finally 12.77 g of 94% strength by weight phenylacetaldehyde (representing 0.1 mol) are introduced. A stream of cold water which keeps the contents of the reactor at 20°C is simultaneously passed through the double jacket.

The oxygen flow rate is thereafter adjusted to 5 l/hour under normal pressure and temperature conditions. The disappearance of the phenylacetaldehyde is followed by gas-liquid chromatography. After 8 hours 30 minutes' reaction under these conditions, the phenylacetaldehyde has been almost quantitatively converted.

The acetic acid is removed by azeotropic distillation of its binary mixture with ethylbenzene under reduced pressure, at 20°–25°C. The distillation residue (15 g) is dissolved in 40 cm³ of benzene and the following components are found, by gas-liquid chromatography, in the solution obtained:

7.2 millimols of benzyl formate
1 millimol of unconverted phenylacetaldehyde
2 millimols of benzaldehyde
82.6 millimols of phenylacetic acid
7.2 millimols of benzoic acid the two acids being determined in the form of their methyl ester after treatment with diazomethane.

The yields relative to the phenylacetaldehyde converted are as follows:

| | |
|---|---|
| phenylacetic acid | 83.4% |
| benzoic acid | 7.3% |
| benzaldehyde | 2% |
| benzyl formate | 7.3% |

EXAMPLES 2 TO 19

Following the procedure of Example 1, a series of processes were carried out under the conditions, and with the results, shown in the table which follows:

| Ex. | Solvent | Catalyst | T°C | Oxidising agent | Duration Time of contact with $O_2$ | Finishing | PA(1) introduced, in mM | Degree of conversion of PA |
|---|---|---|---|---|---|---|---|---|
| 2 | $CH_3COOH$ (98cm³)/ $H_2O$ (2 cm³) | $CH_3COOCoBr$, 14.9 mg | 20 | oxygen 5 l/hr. | 8 hrs. | 20 mins. | 99.3 | 99 % |
| 3 | ditto | $(CH_3COO)_2Co$, 25 mg | 20 | air 10 l/hr. | 8 hrs. | 20 mins. | 100.2 | 69 % |
| 4 | ditto | ditto | 30 | oxygen 5 l/hr. | 5 hrs. | 30 mins. | 99.5 | 99.5% |
| 5 | ditto | ditto | 40 | ditto | 5 hrs. | | 100.5 | 99 % |
| 6 | ditto | $(CH_3COO)_2Co$, 5 mg | 20 | ditto | 8 hrs. | 15 mins. | 100 | 85.6% |
| 7 | Cyclohexane 100 cm³ | $(AA)_3Co$ (1), 25 mg | 30 | ditto | 7 hrs. | | 48.9 | 98 % |
| 8 | ditto | Cobalt | 19 | ditto . | 7 hrs. | | 99.1 | 95.5% |

| Ex. | Solvent | Catalyst | T°C | Oxidising agent | Duration Time of contact with O₂ | Finishing | PA(1) introduced, in mM | Degree of conversion of PA |
|---|---|---|---|---|---|---|---|---|
| | | octanoate (2) | | | 45 mins. | | | |
| 9 | ditto | (AA)₃Mn, 78 mg | 20 | ditto | 7 hrs. 45 mins. | | 49.8 | 90.5% |
| 10 | ditto | (AA)₃Cr, 26 mg | 20–50 | ditto | 8 hrs. | | 50.1 | 90 % |
| 11 | Acetonitrile, 100 cm³ | (AA)₂Cu, 25 mg | 29 | oxygen 5 l/hr | 8 hrs. | | 49.6 | 83.5% |
| 12 | ditto | (AA)₃Fe, 25 mg | 30 | ditto | 8 hrs. 30 mins. | | 49.9 | 87.5% |
| 13 | ditto | (AA)₃Co, 25 mg | 30 | ditto | 5 hrs. 20 mins. | | 98.7 | 99 % |
| 14 | Ethyl acetate, 100 cm³ | (AA)₃Mn, 50 mg | 30 | ditto | 5 hrs. 40 mins. | | 94 | 92 % |
| 15 | Benzene 100 cm³ | (AA)₃Co, 10 mg | 30 | ditto | 7 hrs. | | 50.4 | 100 % |
| 16 | t-Butanol | (AA)₃Co, 30.5 mg | 30 | ditto | 2 hrs. 45 mins. | 3 hrs. | 118 | 99.4% |
| 17 | t-Amyl alcohol | ditto | 30 | ditto | 6 hrs. | 3 hrs. | 99.5 | 97.2% |
| 18 | Acetone | ditto | 30 | ditto | 4 hrs. | 3 hrs. | 101 | 99.7% |
| 19 | Methyl isopropyl ketone | ditto | 30 | ditto | 4 hrs | 3 hrs | 99 | 99.1% |

| Ex. | Solvent | Yields/PA converted | | | |
|---|---|---|---|---|---|
| | | PAA (1) | BA (1) | B(1) | BF(1) |
| 2 | CH₃COOH (98cm³)/ H₂O (2 cm³) | 85 % | 5.6% | 2.04% | 7.4% |
| 3 | ditto | 71 % | 1.45% | 13 % | 12% |
| 4 | ditto | 77.1% | 4.04% | 10.1% | 9% |
| 5 | ditto | 70.3% | 15.8% | 4.25% | 9.5% |
| 6 | ditto | 85 % | 2.38% | 4.25% | 7.2% |
| 7 | Cyclohexane 100 cm³ | 80 % | 6.6% | 5.15% | 6% |
| 8 | ditto | 85 % | 3.08% | 3.68% | 5–6% |
| 9 | ditto | 77.7% | 7.8% | 7.35% | |
| 10 | ditto | 51 % | 2.44% | 6.75% | |
| 11 | Acetonitrile, 100 cm³ | 71.9% | 2.42% | 6.3% | 10% |
| 12 | ditto | 76.3% | 2.98% | 5.7% | 7% |
| 13 | ditto | 66.3% | 18.8% | 4.1% | 6% |
| 14 | Ethyl acetate, 100 cm³ | 69.8% | 13.9% | 14.1% | 1 to 2% |
| 15 | Benzene 100 cm³ | 66 % | 12.1% | 5.9% | 16% |
| 16 | t-Butanol | 68.1% | 24.5% | 1.4% | 0.3% |
| 17 | t-Amyl alcohol | 85.6% | 7.7% | 5.6% | 1.2% |
| 18 | Acetone | 57.4% | 20.4% | 1.5% | 0.3% |
| 19 | Methyl isopropyl ketone | 67.5% | 17.1% | 2.6% | 0.7% |

(1)AA, PA, PAA, BA, B and BF respectively denote the acetylacetonate, phenylacetaldehyde, phenylacetic acid, benzoic acid, benzaldehyde and benzyl formate radical.
(2)101 mg of a solution of cobalt octanoate in cyclohexane, containing 6% of metal.

EXAMPLES 20 TO 22

The procedure of Example 16 is followed, using acetic acid/t-butanol mixtures of varying composition as the solvent.

The results obtained are given in the table below:

| Ex. | Acetic acid, % by weight | t-Butanol, % by weight | Degree of conversion PA, % | Yields/PA converted, % | | | | Duration of passage of O₂ |
|---|---|---|---|---|---|---|---|---|
| | | | | PAA | BA | B | BF | |
| 20 | 30 | 70 | 99.2 | 82 | 15.4 | 1.9 | 0.5 | 2 hrs 45 mins. |
| 21 | 50 | 50 | 98.4 | 86.4 | 8 | 3.6 | 1 | 3 hrs. |
| 22 | 70 | 30 | 97.6 | 85 | 9.1 | 3.9 | 1.9 | 2 hrs 30 mins. |

EXAMPLES 23 TO 34

The procedure of Example 16 is followed, combining derivatives of various metals with a cobalt derivative.

The results obtained are given in the table which follows:

| Ex. | Metal derivatives | | Degree of conversion, PA | Yields/PA converted | | | |
|---|---|---|---|---|---|---|---|
| | Nature | Amount in ppm(1) of metal | | PAA % | BA % | B % | BF % |
| 23 | W(CO)$_6$ | 100 | 97.7 | 71.5 | 16.1 | 4 | 0.3 |
| 24 | Manganese acetylacetonate | 25 | 96.6 | 73.1 | 17.9 | 6.4 | 0.3 |
| 25 | Titanyl acetylacetonate | 50 | 96.6 | 77 | 14.8 | 7.8 | |
| 26 | FeCl$_3$ | 100 | 98.6 | 77.7 | 17.9 | 2.4 | 0.3 |
| 27 | Molybdenum naphthenate | 100 | 92.2 | 80.3 | 8.9 | 6.6 | 0.3 |
| 28 | Thallium acetate | 50 | 98.5 | 83.6 | 14 | 2.1 | 0.3 |
| 29 | PdCl$_2$ | 15 | 96 | 84.6 | 8.1 | 5.3 | 0.3 |
| 30 | Nickel acetylacetonate | 50 | 97.2 | 85.1 | 9.7 | 4.9 | 0.3 |
| 31 | Ammoniacal cerric nitrate | 50 | 97.8 | 85.6 | 10 | 4.2 | 0.3 |
| 32 | Uranyl acetylacetonate | 100 | 96.8 | 86.4 | 7.6 | 5.8 | 0.3 |
| 33 | Silver nitrate | 50 | 97 | 87.1 | 8.1 | 4.5 | |
| 34 | Lead octoate | 100 | 95 | 88.8 | 4.9 | 6.1 | 0.3 |

(1) Parts by weight per million in the reaction mixture.

EXAMPLE 35

This Example was carried out in apparatus similar to that described in Example 1. The apparatus was charged with

| | |
|---|---|
| phenylacetaldehyde | 12.6 g |
| manganese acetylacetonate | 0.031 g (5 mg manganese) |
| lead octoate | 0.044 g (10.5 mg lead) |
| isobutylacetate | sufficient to produce 100 cc of mixture |

The reaction mixture weighed 89 g. The contents of the reactor were brought to a temperature of 30°C. and then oxygen was introduced at the rate of 10 liter per hour measured at normal temperature and pressure. These reaction conditions were maintained for 7½ hours. The reaction product was then analysed by gas liquid chromatography and the following products identified:

| | |
|---|---|
| phenylacetic acid | 90 millimoles |
| benzoic acid | 7 millimoles |
| benzyldehyde | 4.4 millimoles |
| phenylacetaldehyde | 1.5 millimoles |
| benzylformate | 4.2 millimoles |

These results indicate that phenylacetic acid was obtained in 91.5 percent yield based on converted aldehyde and that 98.5 percent of the starting aldehyde was converted.

I claim:

1. A process for oxidising phenylacetaldehyde to phenylacetic acid with molecular oxygen or a gas containing molecular oxygen at 0° to 120°C. and a partial pressure of oxygen of 0.1 to 50 bars which comprises including in the reaction mixture a derivative of a metal selected from the group consisting of chromium, manganese, cobalt, iron and copper, the amount of the said metal in the mixture being between 0.0001 and 5% by weight.

2. A process according to claim 1 wherein the metal is present in ionic form as a salt or as a chelate derived from a dicarbonyl compound or as a complex of the metal.

3. A process according to claim 1 wherein the metal derivative is cobaltous acetate, cuprous acetate, cupric acetate, ferrous acetate, manganous acetate, chromium-III acetate, cobaltous octanoate, manganic acetylacetonate, chromium-III acetylacetonate, cupric acetylacetonate or ferric acetylacetonate.

4. A process according to claim 1, wherein the said metal is cobalt and the reaction mixture also contains a derivative of W, Ti, Mo, Tl, Pd, Ni, Ag, Ce, Pb or U.

5. A process according to claim 1, wherein the said metal is cobalt and the reaction mixture also contains at least one derivative of a metal of Group 3a or 4a of the Periodic Classification of Elements or of the lanthanide or actinide Groups selected from thallium, lead, cerium and uranium.

6. A process according to claim 1 wherein the oxidation is carried out in the presence of an inert solvent.

7. A process according to claim 6 wherein the inert solvent is at least one aliphatic hydrocarbon containing at least 4 carbon atoms, cycloaliphatic hydrocarbon or aromatic or alkyl aromatic hydrocarbons, alkyl-, cycloalkyl-, or aryl halide or an aliphatic carboxylic acid or ester thereof, a nitrile, a tertiary alcohol or a ketone.

8. A process according to claim 7, wherein the solvent is acetic acid, cyclohexane, benzene, ethyl acetate, acetonitrile, tert. butanol, tert. amyl alcohol, acetone or methyl isopropyl ketone.

9. A process according to claim 7, wherein the solvent is a mixture of a tertiary alcohol with an aliphatic carboxylic acid, hydrocarbon, akyl-, cycloalkyl- or aryl halide or nitrile.

10. A process according to claim 9, wherein the solvent is a mixture of 10 to 90% by weight of an aliphatic carboxylic acid and 90 to 10% by weight of a tertiary alcohol.

* * * * *